(12) United States Patent
Pillart

(10) Patent No.: US 6,957,742 B1
(45) Date of Patent: Oct. 25, 2005

(54) VENTED TRAP

(76) Inventor: Paul T. Pillart, 1 Bessemer St., Curtisville, PA (US) 15032

( * ) Notice: Subject to any disclaimer, the term of this patent is extended or adjusted under 35 U.S.C. 154(b) by 443 days.

(21) Appl. No.: 10/116,494

(22) Filed: Apr. 4, 2002

(51) Int. Cl.[7] .................. B01D 35/30; B01D 35/147
(52) U.S. Cl. ............. 210/436; 210/120; 210/169; 210/416.2; 210/435; 210/472; 251/222; 251/237; 137/315.04
(58) Field of Search .................. 210/120, 169, 210/188, 416.2, 435, 472, 436; 137/315.04, 137/557; 251/227, 337

(56) References Cited

U.S. PATENT DOCUMENTS

| | | | |
|---|---|---|---|
| 4,126,558 A | 11/1978 | Luceyk | |
| 4,629,557 A | 12/1986 | Tobias | |
| 4,869,817 A | 9/1989 | Mendoza et al. | |
| 5,100,541 A | 3/1992 | Kallenbach | |
| 5,269,913 A | 12/1993 | Atkins | |
| 5,308,386 A | * 5/1994 | Wilkes | ............ 210/188 |
| 5,435,339 A | * 7/1995 | Hayes | ............ 137/315.04 |
| 5,474,674 A | 12/1995 | Bresolin et al. | |
| 5,527,455 A | 6/1996 | Hoffa | |
| 5,605,622 A | 2/1997 | Ferraro | |
| 5,665,227 A | 9/1997 | Watt | |
| 5,750,022 A | 5/1998 | Blake et al. | |
| 5,762,785 A | 6/1998 | Garrigos Ruiz | |
| 6,187,179 B1 | 2/2001 | Mayer et al. | |
| 6,251,285 B1 | 6/2001 | Ciochetti | |
| 6,254,769 B1 | 7/2001 | Whittaker | |

* cited by examiner

Primary Examiner—David A. Reifsnyder

(57) ABSTRACT

A swimming pool debris trap having an externally operable venting mechanism for reducing pressure or vacuum in the trap.

10 Claims, 7 Drawing Sheets

VENTED TRAP

TECHNICAL FIELD

The invention relates to debris traps for swimming pools.

BACKGROUND ART

U.S. Pat. Nos. 5,100,541, 5,269,913, 5,605,622, 5,750,022, and 6,251,285 illustrate debris trap technology for swimming pools.

Debris traps are used to capture coarse material, such as tree leafs, cloth, lint, that would otherwise plug a swimming pool filter or pump. U.S. Pat. Nos. 5,605,622 and 6,251,285 illustrate examples of how such traps are placed in the circulatory systems of swimming pools.

In U.S. Pat. No. 5,605,622, a debris trap in the form of chamber 23 is placed at the intake of a pump whose output is connected to a filter, and a debris trap in the form of vacuum module 32 is interposed between a vacuum device 62 and chamber 23. Chamber 23 catches debris from the skimmer device 18 and floor drain 19, as well as debris that escapes vacuum module 32.

In U.S. Pat. No. 6,251,285, a debris trap 54 intercepts debris in the water from floor drain 56 and an unlabeled skimmer, before the intake of pump 58, whose output is connected to an unlabeled filter. The cover of trap 54 contains a vacuum relief. The venting mechanism to relieve vacuum is actuated internally, when an extraordinary, dangerously high vacuum is sensed.

DISCLOSURE OF INVENTION

It is an object of the invention to facilitate opening of debris traps for the cleaning thereof.

This objects (as well as other objects which will become apparent from the discussions below) is achieved by:

A swimming pool debris trap having an externally operable venting mechanism for reducing pressure or vacuum in the trap.

MODES OF THE INVENTION

An embodiment of the invention is illustrated in the enclosed FIGS. 1–6. The illustrated embodiment is a modification of a debris trap manufactured by Hayward Manufacturing Co. of Elizabeth, N.J., or H-TECH INC. of Wilmington, bearing Model No. SP-1515 and the numbers 73/026590 and 1122980.

The debris trap comprises a canister 10 and a lid 12 for the canister. The canister has an inlet 14 for debris-bearing water. In the part of the canister below the cutoff 16 are a strainer basket (not shown) for collecting debris and an outlet (not shown) for debris-cleaned water.

Figure 1:
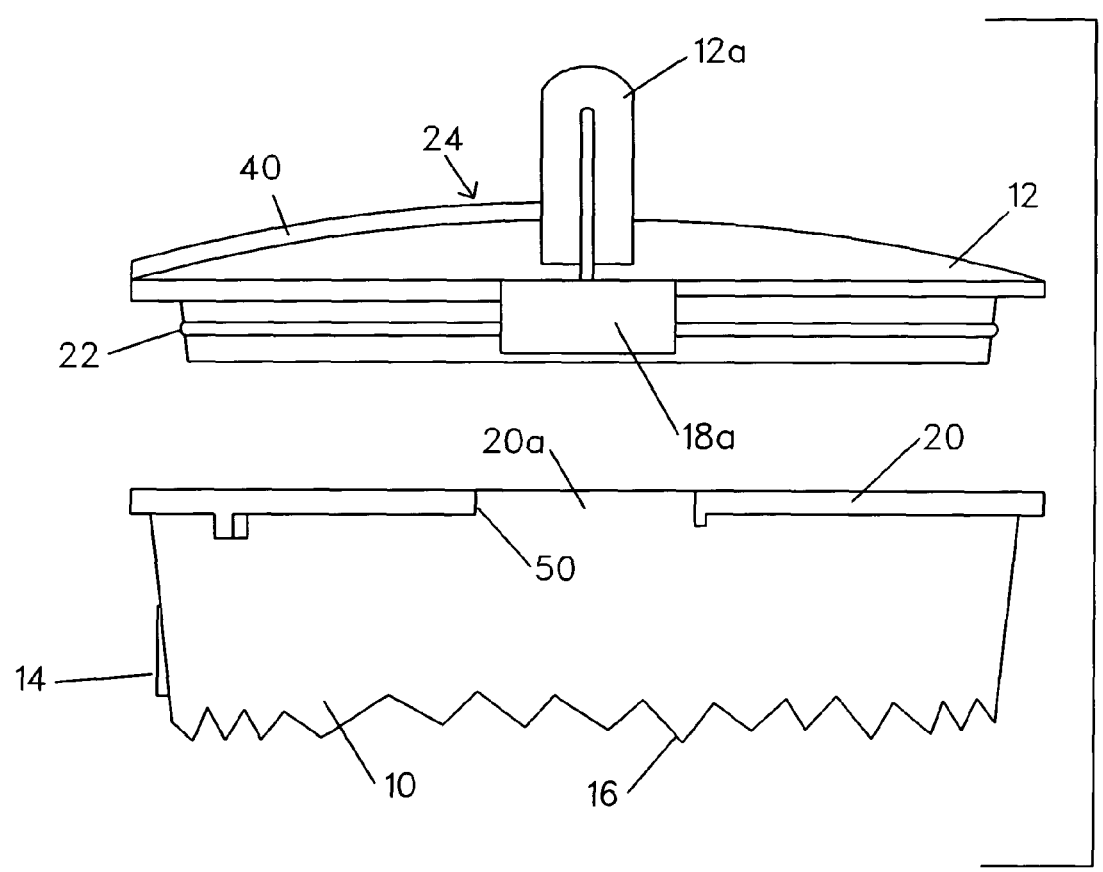
FIG. 1 is an exploded, elevational view of a debris trap lid and canister, with the lower part of the cannister broken away.
Figure 2:
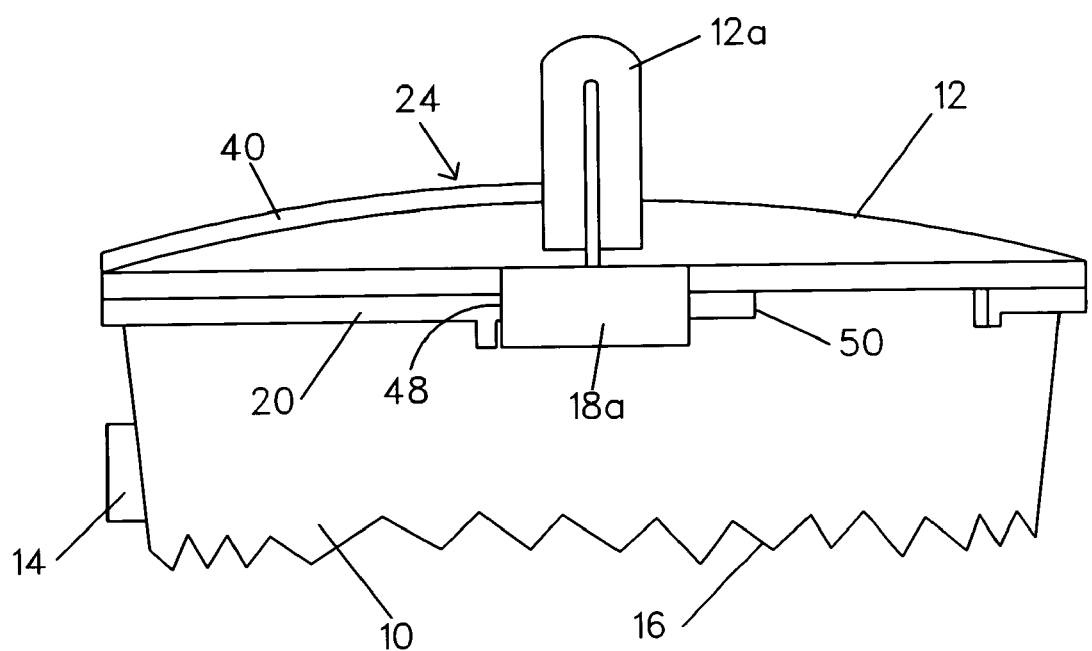
FIG. 2 is a view as in FIG. 1 of the assembled debris trap.
Figure 3:
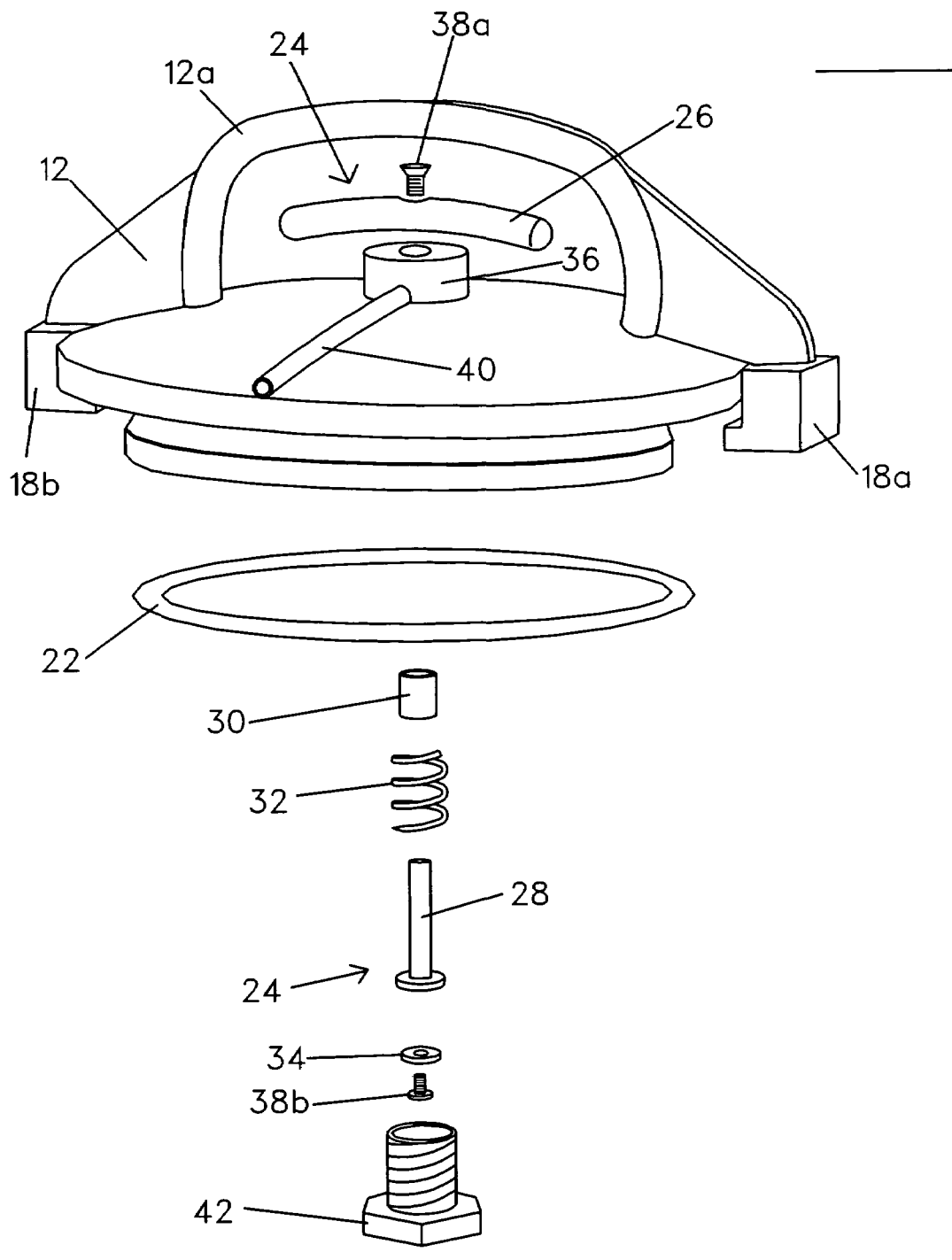
FIG. 3 is an exploded, perspective view of the lid of FIGS. 1 and 2.
Figure 4:
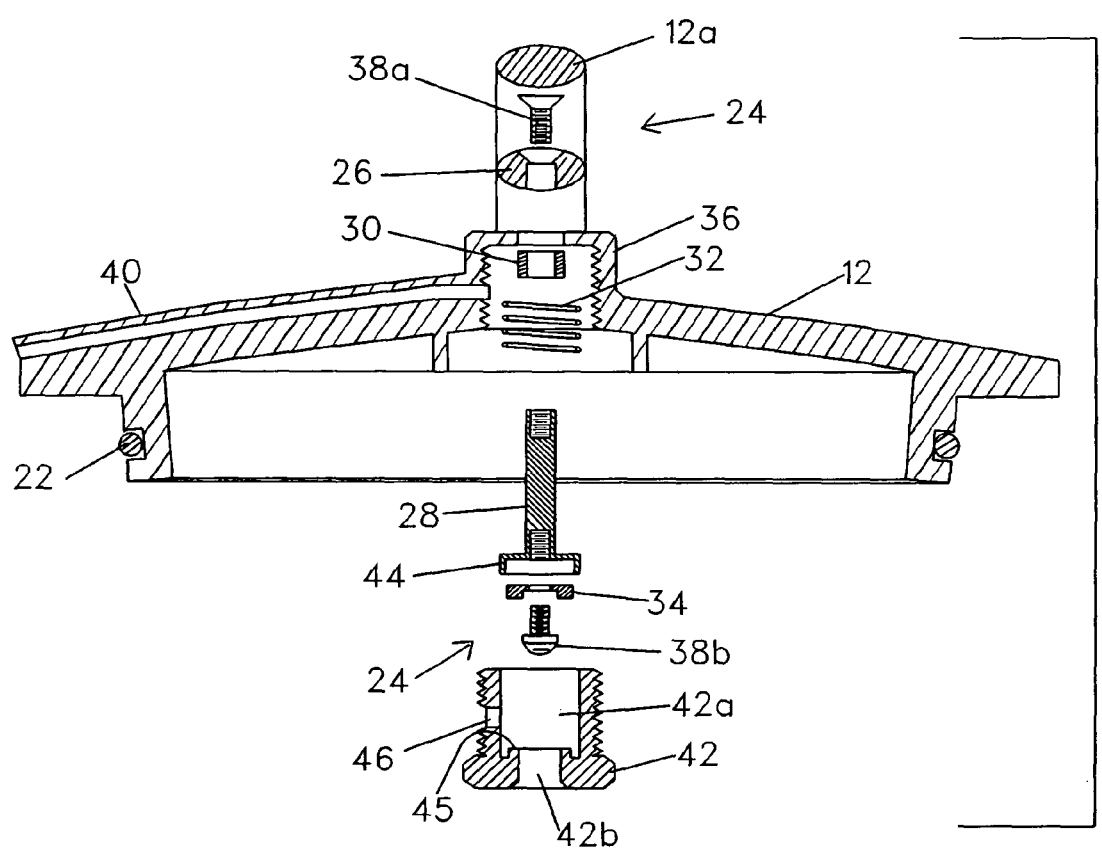
FIG. 4 is an exploded, cross sectional view of the lid of FIG. 3.
Figure 6:
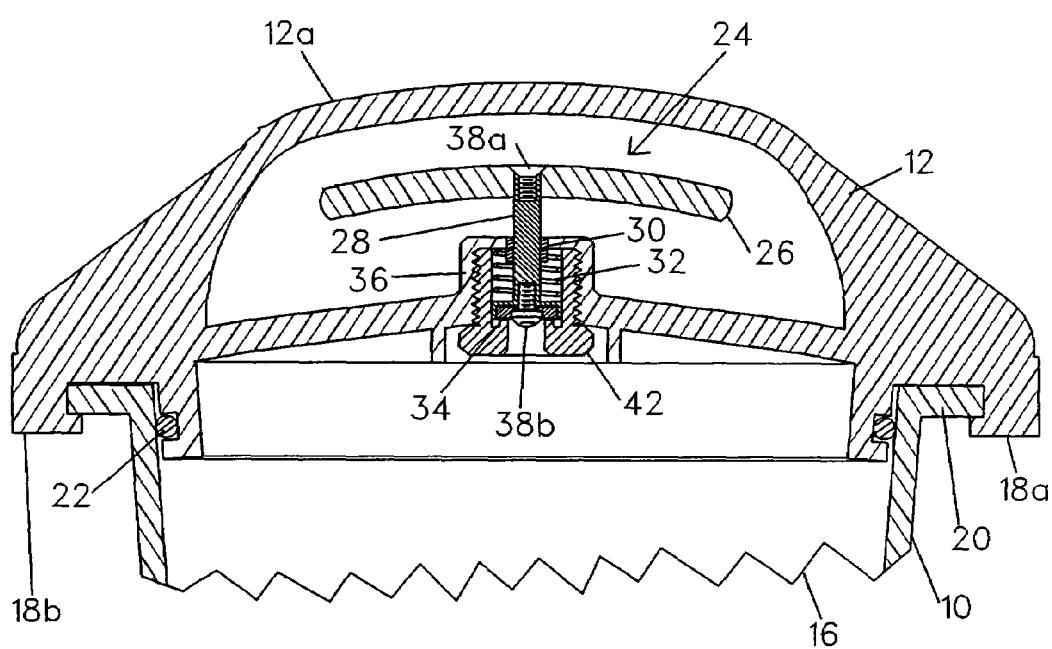
FIG. 6 is a view taken on the cutting plane 6—6 of FIG. 5A.

Comparison particularly of FIGS. 1 and 2 shows how lid 12 can be brought into assembly with canister 10. The lid is lowered onto the canister, from an aligned position with the canister as illustrated in FIG. 1, to bring lug 18a into gap 20a of boss 20 on the rim of the canister. A lug 18b on the opposite side of the lid similarly descends into a similar gap (not shown) of boss 20 on the opposite side of the canister. Lid and canister are then rotated relative to one another about their common axis to bring the lugs into clamping relationship on boss 20, as shown in FIGS. 2 and 6. In assembly, the canister and lid are tightly sealed by O-ring 22.

Lid 12 is equipped with a venting mechanism 24 for selectively venting the interior of the debris trap to the atmosphere. The venting mechanism includes venting handle 26, shaft 28, gasket 30, spring 32, rubber washer 34, housing 36, two screws 38a,b, outlet tube 40, and plug 42. Shaft 28 has a pan 44 on its bottom end. As shown particularly in FIG. 4, plug 42 is threaded externally, to screw into internally threaded housing 36; it has an upper cylindrical chamber 42a and a lower cylindrical orifice 42b crowned by a circular ridge 45; chamber 42a has a port 46 in its wall.

Figure 5A:
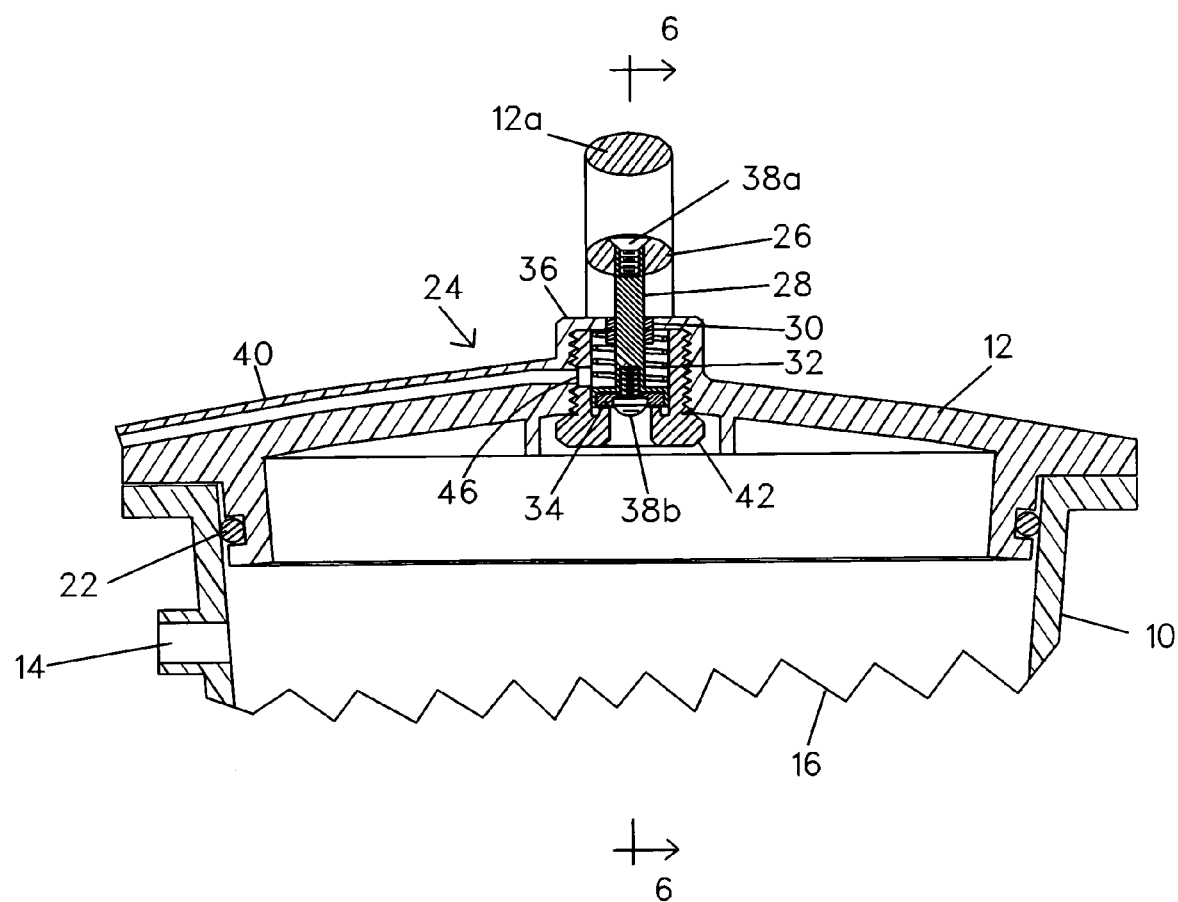
FIGS. 5A and 5B are views as in FIG. 4, showing the parts in assembly, and the lid assembled with the cannister, with the lower part of the cannister broken away, FIG. 5A being for vent-closed position and FIG. 5B for vent-open position.
Figure 5B:
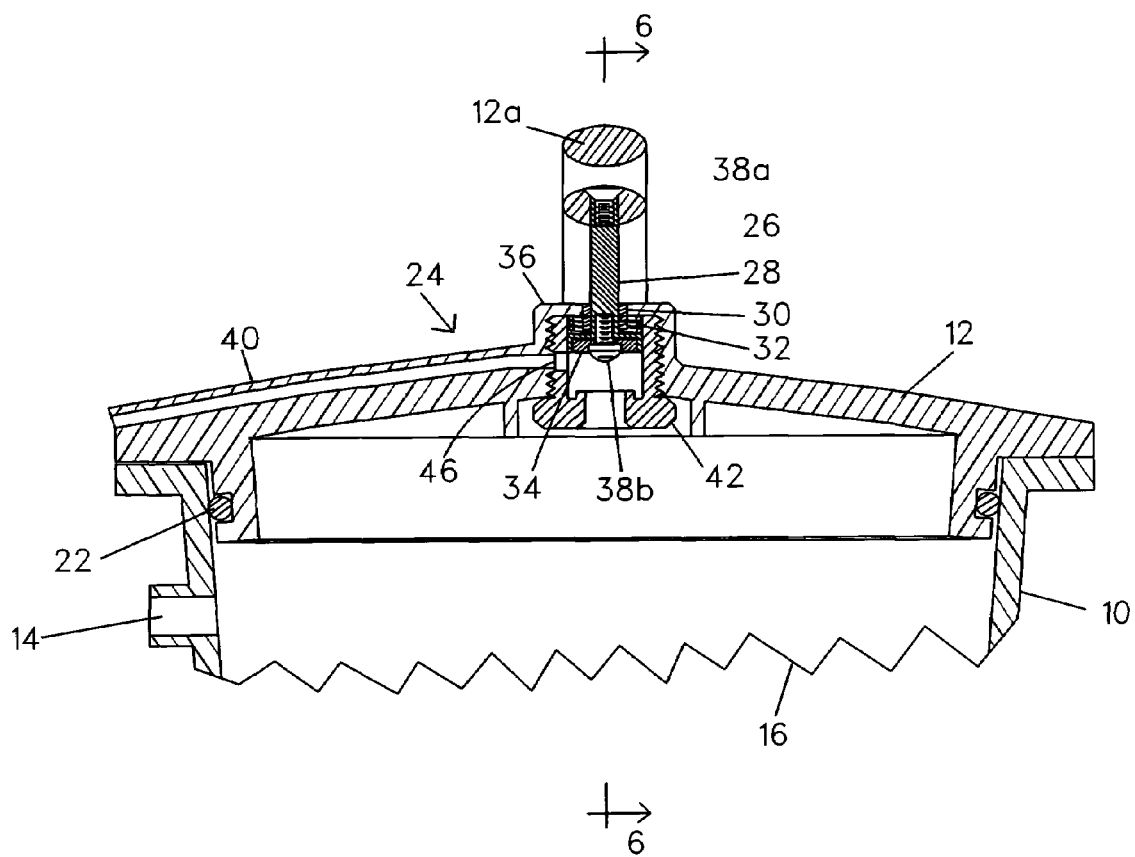

The parts of venting mechanism 24 interrelate as follows. Screw 38a joins the top of shaft 28 to venting handle 26. Lid handle 12a may be provided with a hole (not shown) to allow access for a screwdriver to drive screw 38a from above. Screw 38b holds washer 34 in the pan 44 (FIG. 4) at the bottom of shaft 28. Spring 32 bears between the back of pan 44 and the top interior of housing 36. In the vent-closed position as shown in FIG. 5A, spring 32 forces washer 34 against circular ridge 45 in plug 42 to seal the interior of the trap. The force exerted by spring 32 in the vent-closed position is sufficient to resist hydrostatic forces which the interior of the trap may experience when the swimming pool pump is off. In the vent-open position as shown in FIG. 5B, spring 32 is compressed by the raising of venting handle to retract washer 34 from circular ridge 46 and raise pan 44 above port 46, this venting the interior of the debris trap through port 46 into tube 40 to the atmosphere. Bushing 30 acts as a bearing for the up-down movement of shaft 28 and prevents water from escaping out the top of housing 36, when the trap is vented under pressure.

To vent the trap in preparation for removing lid 12 from canister 10, one's palm is placed on the lid handle 12a, with the fingers extending down to curl around venting handle 26. Raising of the fingers toward the palm then lifts handle 26 toward lid handle 12a, to vent the interior of the trap to the atmosphere. Concurrent counterclockwise twisting with the hand on handle 12a, perhaps with the other hand holding the canister at inlet 14, or squeezing side 48 (FIG. 2) of lug 18a toward end 50 of boss 20, opens the trap for cleaning of its strainer basket.

An interesting feature of the illustrated debris trap is that the contacting surfaces of the lugs 18a,b with the boss in the trap-closed state in FIG. 2 are horizontal. This means that pressure in the trap cannot make it easier to twist lid 12 to remove lid 12 from the canister, this being in contrast to the situation which would exist, if lid 12 attached to canister 10 by way of inclined screw threads.

Therefore, both vacuum in the trap and pressure in the trap increase the frictional force between lugs 18a,b and boss 20 that must be overcome, in order to twist lid 12 free from the canister. This is of importance to the pool owner or maintenance person who desires to clean the trap's strainer basket while the swimming pool is operating. Thus, if one tries to open the trap while the pump is running, vacuum in the trap makes the trap difficult to open, and if one tries to open the trap when the pump is off, pressure in the trap from a hydrostatic head in the trap resulting from the trap being lower than the water level in the pool can also make the trap difficult to open. The modification of the trap provided by the present invention makes it easier in both cases to open the trap by providing a means to vent vacuum or pressure to atmosphere, when it is desired to open the trap.

The present invention can be used in combination with the invention of the above-referenced U.S. Pat. No. 6,251,285, because that patent is set to actuate only in cases of abnormally high vacuums, whereas the present invention is used for relieving normal vacuums and pressures.

There follows, now, the claims. It is to be understood that the above are merely preferred modes of carrying-out the invention and that various changes and alterations can be made without departing from the spirit and broader aspects of the invention as defined by the claims set forth below and by the range of equivalency allowed by law.

What is claimed is:

1. A swimming pool debris trap having an externally actuatable venting mechanism for reducing pressure or vacuum in the trap, further comprising a lid and a canister, the lid carrying the venting mechanism, the venting mechanism being spring-biased into a vent-closed position.

2. A swimming pool debris trap as having an externally actuatable venting mechanism for reducing pressure or vacuum in the trap, further comprising a lid and a canister, the lid carrying the venting mechanism, the venting mechanism having a venting handle for actuating the venting mechanism, the lid having a lid handle, the venting handle being parallel to the lid handle.

3. A trap as claimed in claim 2, the venting handle being beneath the lid handle.

4. A swimming pool debris trap having an externally actuatable venting mechanism for reducing pressure or vacuum in the trap, the venting mechanism comprising a shaft extending through a wall of the trap, a spring biasing the shaft into a vent-closed position, whereby external actuation of the shaft against the spring can move the shaft into a vent-open position.

5. A trap as claimed in claim 4, the venting mechanism further comprising a plug, a pan on an end of the shaft, and a washer in the pan, the plug having a circular ridge, the washer bearing against the circular ridge in the vent-closed position.

6. A trap as claimed in claim 5, the plug having a port, the washer being free of the ridge and above the port in the vent-open position, whereby the trap can vent through the port in the vent-open position.

7. A swimming pool debris trap having an externally actuatable venting mechanism for reducing pressure or vacuum in the trap, further comprising a lid and a canister, the lid carrying the venting mechanism, the venting mechanism comprising a shaft extending through the lid, a spring biasing the shaft into a vent-closed position, whereby external actuation of the shaft against the spring can move the shaft into a vent-open position.

8. A trap as claimed in claim 7, the venting mechanism further comprising a plug, a pan on an end of the shaft, and a washer in the pan, the plug having a circular ridge, the washer bearing against the circular ridge in the vent-closed position.

9. A trap as claimed in claim 8, the lid having a tube extending radially outwards on the lid, the plug having a port opening into said tube, the washer being free of the ridge and above the port in the vent-open position, whereby the trap can vent through the port into the tube to atmosphere in the vent-open position.

10. A swimming pool debris trap having an externally actuatable venting mechanism for reducing pressure or vacuum in the trap, further comprising a lid and a canister, the lid carrying the venting mechanism, the canister having a boss, the lid having lugs clamping the boss for holding the lid to the canister in a trap-closed state, contacting surfaces of the lugs with the boss in the trap-closed state being horizontal.

* * * * *